(12) United States Patent
Gryspeerdt

(10) Patent No.: US 6,500,063 B1
(45) Date of Patent: Dec. 31, 2002

(54) DISCHARGE MEANS FOR A THRESHING AND SEPARATING UNIT IN A COMBINE HARVESTER

(75) Inventor: José G. T. Gryspeerdt, Poesele (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/857,813
(22) PCT Filed: Nov. 24, 2000
(86) PCT No.: PCT/EP00/12073
§ 371 (c)(1), (2), (4) Date: Jun. 11, 2001
(87) PCT Pub. No.: WO01/37639
PCT Pub. Date: May 31, 2001

(30) Foreign Application Priority Data

Nov. 26, 1999 (GB) .............................. 9927839

(51) Int. Cl.[7] .............................. A01F 12/44; B07B 1/00
(52) U.S. Cl. .............................. 460/79; 460/66
(58) Field of Search .............................. 460/79, 112, 901, 460/44, 63, 66, 71, 78, 73, 111, 113; 241/243, 186.3

(56) References Cited

U.S. PATENT DOCUMENTS

| | | | | |
|---|---|---|---|---|
| 3,669,122 A | * | 6/1972 | Rowland-Hill | 460/73 |
| 3,670,739 A | * | 6/1972 | Rowland-Hill | 460/66 |
| 3,848,609 A | * | 11/1974 | Mortier et al. | 460/66 |
| 3,916,912 A | * | 11/1975 | Rowland-Hill | 460/66 |
| 4,078,571 A | * | 3/1978 | Todd et al. | 460/66 |
| 4,208,858 A | * | 6/1980 | Rowland-Hill | 56/14.6 |
| 4,669,489 A | * | 6/1987 | Schraeder et al. | 460/112 |
| 4,889,517 A | * | 12/1989 | Strong et al. | 460/66 |
| 5,112,279 A | * | 5/1992 | Jensen et al. | 460/69 |
| 5,688,170 A | * | 11/1997 | Pfeiffer et al. | 460/69 |
| 5,833,533 A | * | 11/1998 | Roberg | 460/112 |
| 6,083,102 A | * | 7/2000 | Pfeiffer et al. | 460/68 |

FOREIGN PATENT DOCUMENTS

EP  1031270  * 8/2000  .............. A01F/7/06

* cited by examiner

Primary Examiner—Thomas B. Will
Assistant Examiner—Árpád Fábián Kovács
(74) Attorney, Agent, or Firm—John William Stader; Larry W. Miller

(57) ABSTRACT

A combine harvester comprises a threshing and separating mechanism mounted to a main frame, which includes a generally cylindrical chamber having a generally longitudinal axis, and a separating concave assembly. The arrangement further includes a rotor assembly mounted for rotation in the chamber and comprising a generally cylindrical rotor body with a separating section associated with the separating concave assembly. The separating mechanism further comprises a beater assembly arranged behind the concave assembly for receiving threshed and separated crop material therefrom and projecting it rearwardly. The beater assembly comprises a transverse guide mounted behind the separating concave assembly and below the rotor body, and a transverse beater rotor. The chamber comprises a curved guide plate arranged behind the separating concave assembly and above the guide. This guide plate distributes the separated crop material over the full width of the guide in order to minimize the chance that material starts accumulating in the one or other corner and the separating system gets plugged.

5 Claims, 3 Drawing Sheets

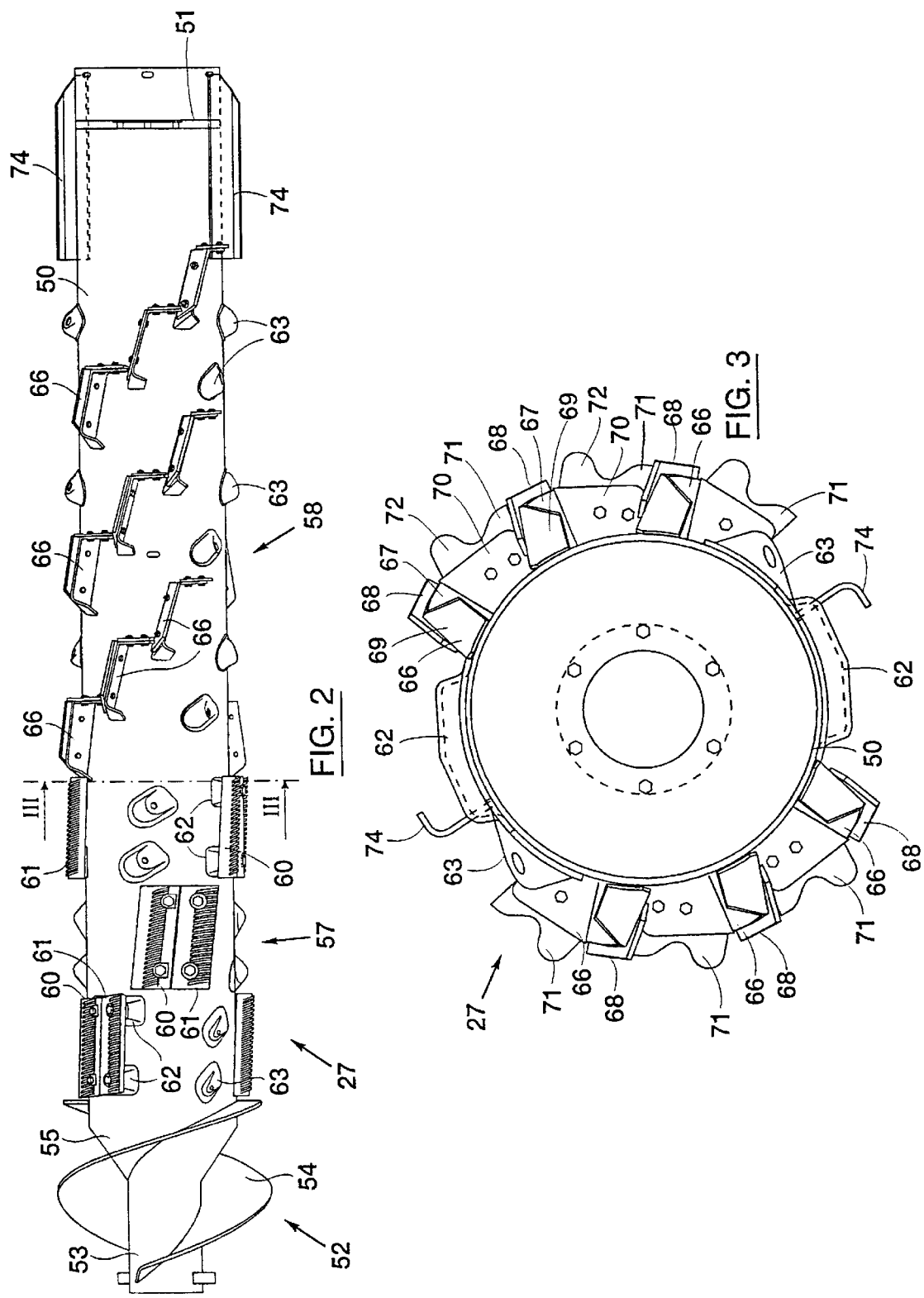

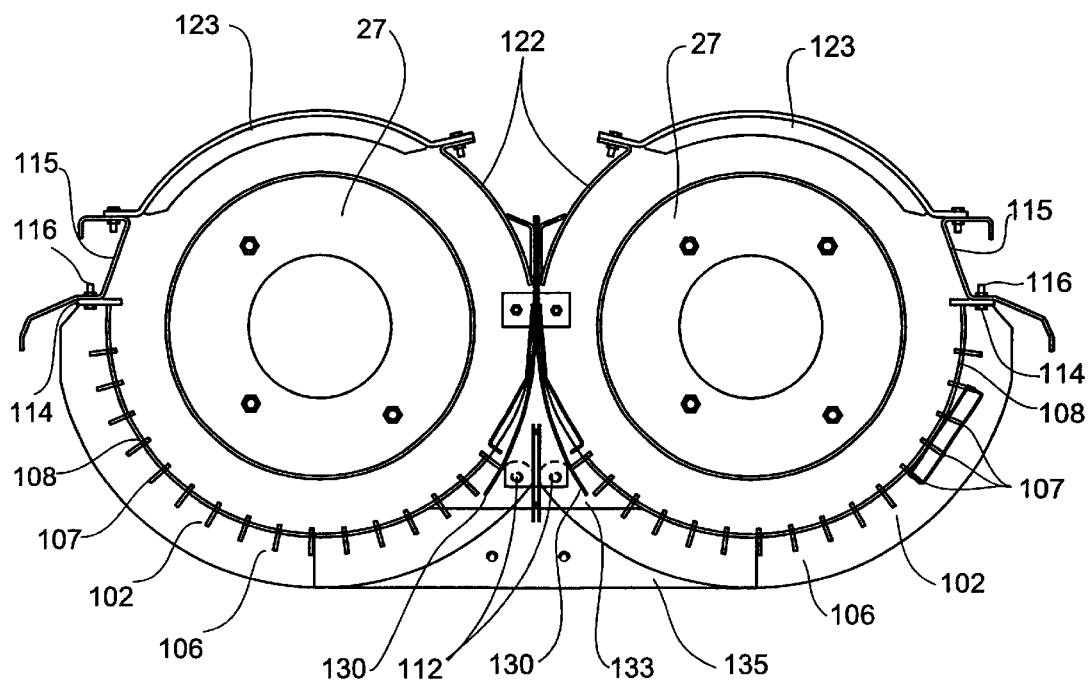
FIG. 4
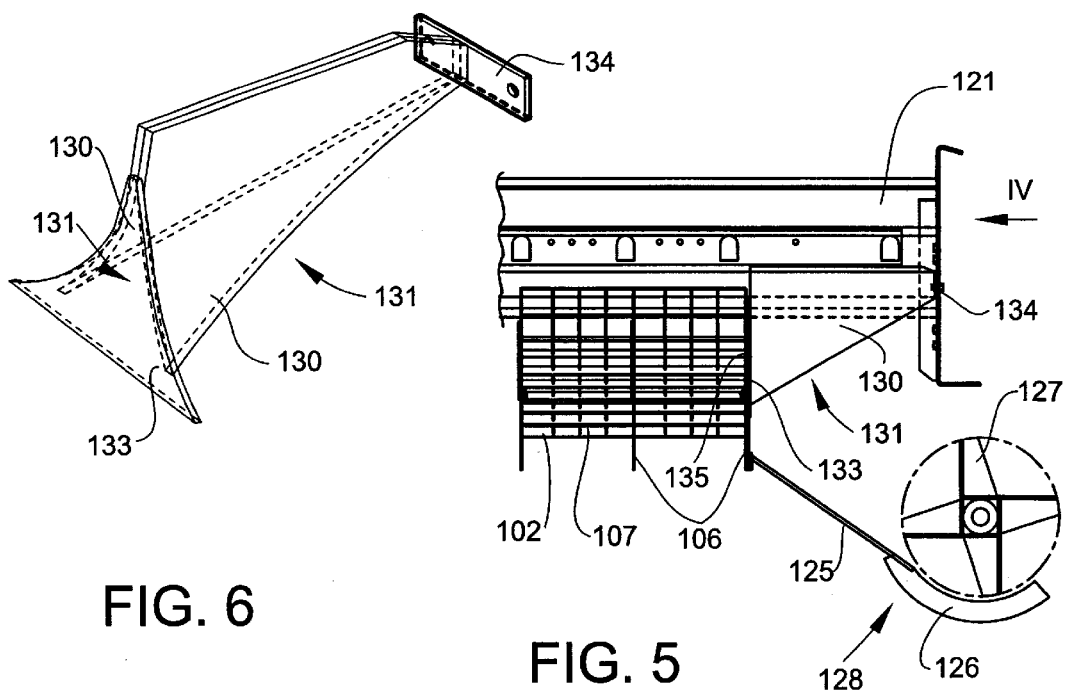
FIG. 6
FIG. 5

DISCHARGE MEANS FOR A THRESHING AND SEPARATING UNIT IN A COMBINE HARVESTER

TECHNICAL FIELD OF THE INVENTION

The present invention relates to agricultural harvesters and, more particularly, to axial flow combine harvesters having a threshing and separating unit with at least one generally longitudinally arranged rotor for advancing crop material along a generally helical path. In particular it relates to the discharge means provided adjacent the discharge end of the threshing and separating unit.

BACKGROUND ART

In axial flow combines the harvested crop is threshed and separated as it is conveyed between a longitudinally arranged rotor and the inner surface of an associated chamber comprising threshing and separating concaves. The straw is conveyed along a helical path along the inner surface of the chamber until it reaches the end thereof. Commonly, the chamber ends before the outlet of the combine and the paddles mounted to the rear end of the rotor throw the straw downwardly, in the direction of the sieves of the cleaning system.

In order to prevent the accumulation of straw on the upper sieve, the threshing and separating system usually is provided with a beater rotor to which the threshed straw is fed via a guide plate and which ejects the straw through the outlet of a rear hood onto the field. Such structure is described in U.S. Pat. Nos. 3,669,122 and 3,916,912.

However, most of the straw which is released by the rotor and the chamber tends to concentrate at one side of the combine harvester, i.e. near the side where the helical flow path reaches the end of the chamber and the crop starts following a straight, downward trajectory.

When the crop starts accumulating on the guide plate to the beater, its rearward flow may be hampered and the area between the chamber outlet and the beater may quickly get plugged. Finally the crop flow through the chamber itself is halted and the threshing and separator rotor will get stuck, unless the operator takes immediate action and clears the plugged rear area.

Accordingly there is a need for a means that reduces the chances that crop material starts accumulating in the area above the guide plate to the beater.

SUMMARY OF THE INVENTION

According to the present invention, there is provided a combine harvester comprising:
a main frame;
a threshing and separating arrangement mounted to said main frame and including:
  a generally cylindrical chamber having a generally longitudinal axis and comprising a separating concave assembly; and
  a rotor assembly mounted for rotation in said chamber and comprising a generally cylindrical rotor body with a separating section associated with said separating concave assembly; and
a beater assembly arranged behind said concave assembly for receiving threshed and separated crop material therefrom and projecting it rearwardly, said beater assembly comprising a transverse guide means mounted behind said separating concave assembly and below said rotor body, and a transverse beater rotor;
characterised in that said chamber comprises a curved guide plate arranged behind said separating concave assembly and above said guide means for distributing the separated crop material over the full width of said guide means.

The curved guide plate minimizes the chances that material starts accumulating in the one or other corner and the full separating system gets plugged.

Preferably the guide plate has an outlet edge which is oriented in a direction which is generally transverse to the direction of the crop flow. So the edge intersects the helical flow at an angle. In a preferred embodiment, the curved guide plate has a generally triangular shape with its base adjacent the separating concave and the tip adjacent the rear end of the chamber. The guide plate may have an upper edge extending at the level of the axis of the cylindrical chamber.

This arrangement provides for a simple yet effective flow spreading dividing structure. It may be used advantageously in a harvester having a pair of juxtaposed cylindrical chambers. Then the guide plates for each chamber may be linked together to form one guide element providing two guide surfaces.

The guide element may be used in combination with a threshing and separator rotor having adjacent its rear end a plurality of generally longitudinally arranged paddles for assisting in discharging the crop. The rotor further may be provided with a plurality of longitudinal elements having a leading, generally longitudinally arranged crop engaging face, and a plurality of transverse elements having a generally transversely arranged crop engaging edge.

DESCRIPTION OF THE FIGURES

A combine harvester in accordance with the present invention will now be described in greater detail, by way of example, with reference to the accompanying drawings, in which:

FIG. 2 is an enlarged side view of one of the rotors of the threshing and separating unit of FIG. 1;

FIG. 3 is cross sectional view of the rotor, taken along line III—III of FIG. 2;

FIG. 4 is a rear view of the threshing and separating unit taken in the direction of arrow IV in FIG. 5;

FIG. 5 is an enlarged side view of the rear section of the threshing and separating unit of FIG. 4, showing a combined guide plate; and FIG. 6 is a perspective view of the guide plate of FIG. 5.

DETAILED DESCRIPTION OF AN EMBODIMENT OF THE INVENTION

Figure 1:
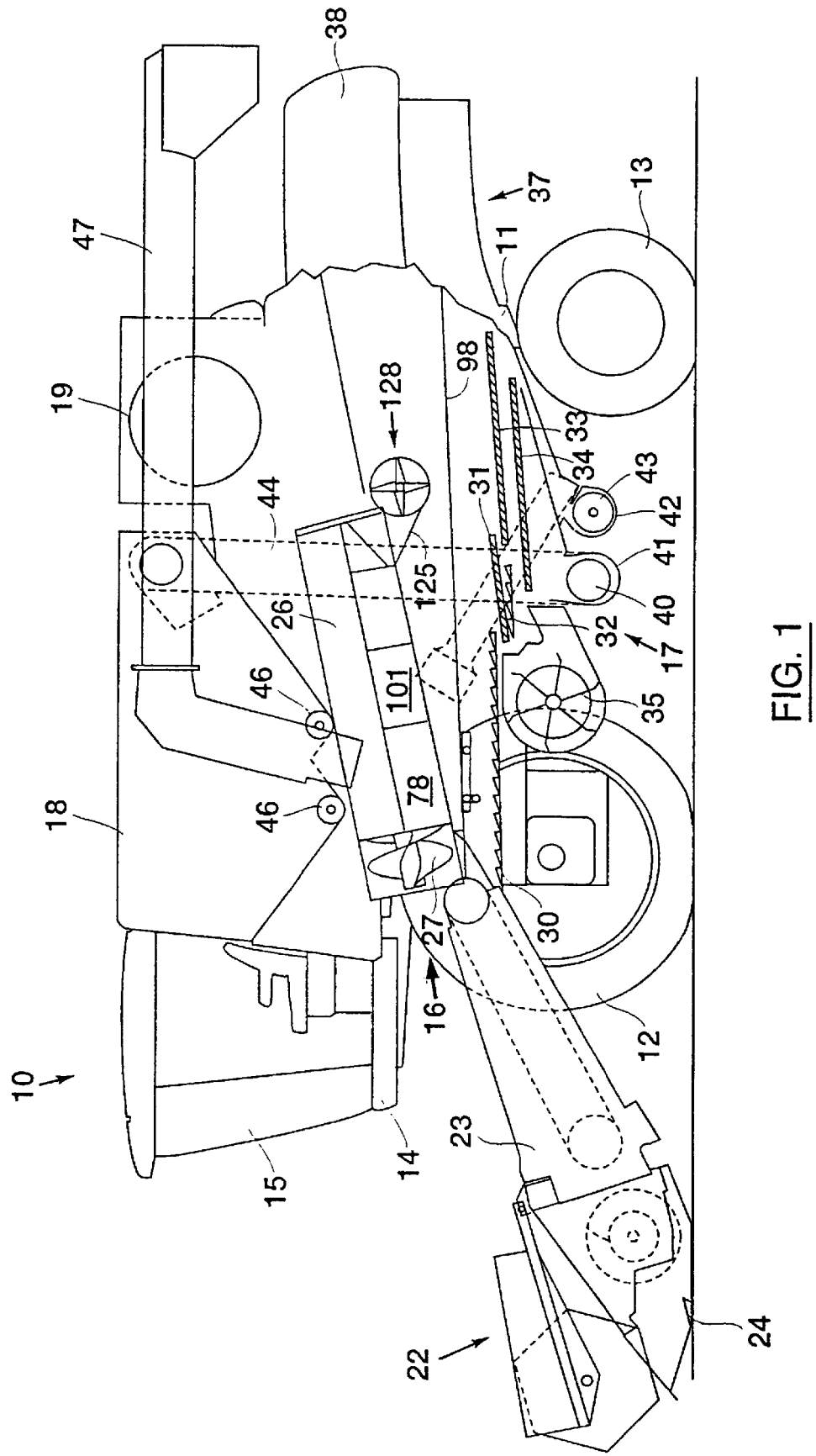
FIG. 1 is a diagrammatic, partly sectional side view of a combine harvester having an axial flow threshing and separating unit.

The terms "grain", "straw" and "tailings" are used principally throughout this specification for convenience at it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

The combine harvester 10 shown in FIG. 1 of the accompanying drawings, is of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers and the rotors are described in further detail hereinafter.

Grain which has been separated by the threshing and separating assembly 16 falls onto a first grain pan 30 of the cleaning assembly 17 which further also comprises a precleaning sieve 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

The rotors 27 of the threshing and separating assembly 16 are mirror images of each other. The left-hand rotor 27, which is shown in FIGS. 2 and 3, is rotated by appropriate means (not shown) in a counter-clockwise direction as seen from the front of the combine harvester 10. The right-hand rotor is rotated in the opposite sense. The main body 50 of each rotor 27 is constituted by a cylindrical tube mounted on discs 51 which are supported on front and rear stub shafts (not shown). The front end of the rotor is provided with an infeed section 52 having a cylindrical tube portion 53 of reduced diameter and a conical tube portion 55 which provides a transition between the portion 53 and the main body 50 of the rotor. A pair of auger flights 54 is welded to the infeed section of each rotor and serves to transfer crop material from the rear end of the straw elevator 23 to the left and right threshing and separating chambers 26.

Each rotor 27 has a threshing section 57, immediately following the infeed section 52, and the threshing section is followed by a separating section 58. The threshing section 57 has a plurality of rasp bars 60, 61 bolted onto rasp bar mounts 62 which are provided at predetermined positions around the periphery of the threshing section 57. The rasp bar mounts are arranged in pairs for fastening a leading rasp bar 60 and a trailing rasp bar 61 to each pair of mounts 62. Also further mounts 63 are provided at predetermined positions both in the threshing section 57 and the separating section 58. These further mounts can be used for mounting thinning rods (not shown) to the rotor 27.

Further details on the configuration of the mounts 62, 63 and the rasp bars 60, 61 can be taken from U.S. Pat. No. 4,889,517, column 3, line 31 to column 7, line 15, incorporated herein by reference.

The separating section 58 of the rotor 27 has several sets of supports 66 for crop engaging elements, which supports are welded at predetermined positions to this separating section 58. Each set comprises three supports 66 which are arranged along helical paths on the rotor body 50. Accordingly the second and third supports 66 are staggered with respect to the first and second support, respectively. The supports 66 are made out of sheet material and generally take the shape of an inverted U with the legs extending rearwardly with respect to the normal crop flow.

The front section 69 of the supports 66 is almost perpendicular to the cylindrical surface of the rotor 27. The surface of this section 69 is inclined slightly rearwardly and its outer edge is sloping inwardly towards the rotor surface.

The middle section 67 of each support 66 is oriented in a generally longitudinal direction. It is positioned at an acute angle (in the range of 12°) to the axis of rotor 27 for better matching the helical flow of the straw and other crop material along the confines of the chamber 26. The surface of the middle section 67 extends from the rotor surface and its leading face is inclined rearwardly with respect to the direction of rotation of the rotor 27. The face may be positioned at an angle of about 75° to the surface of the tube 50. Each middle section 67 has a pair of mounting holes for attaching to its leading face a wear plate 68 of a generally rectangular shape. The wear plates 68 have a front edge which is inclined outwardly and rearwardly to match the plane of the adjacent front section 69 and an outer edge which extends beyond the outer edge of the support 66. Because of their backwards inclined orientation (about 15°), the leading faces of the wear plates 68 tend to force the crop material outwardly against the confines of the cylindrical chamber 26.

The supports 66 further have rear sections 70 which extend from the rear ends of the middle sections 67 in a direction which is generally transverse to the axis of the rotor 27, at an angle of about 87° thereto. In each set of three supports 66, the rear ends of the first and second sections 70 terminate short of the front ends of the middle sections of the second and third support 66, respectively. The plane of the rear sections 70 is generally perpendicular to the surface of tube 50. Each section 70 is provided with a pair of mounting holes for attaching thereto a wear finger plate 71. These plates 71 also have leading edges which are inclined backwards, thereby matching the plane of the longitudinal wear plates 68. At its leading end, each finger plate 71 has a curved protrusion 72 extending beyond the support 66 and constituting the most outward part of the separating section 58 of the rotor 27. The middle portion of the plate 71 is curved inwardly and its trailing portion has a substantially straight edge, parallel to the rotor tube 50 and ending short of the front face of the next, longitudinal wear plate 68. The protrusions 72 engage the crop flow inside the chamber and have a thinning and splitting effect thereupon. Consequently the chances for "roping" of the straw and the consequent blocking of the rotors 27 are reduced substantially by the dedicated outer profile of the wear finger plate 71. This is especially effective under circumstances where the stems of the crop material still contain some humidity.

The thinning effect of the rotor 27 can be enhanced even further by mounting thinning rods (not shown) to the mounts 63 which are distributed between the supports 66. These rods extend perpendicularly from the flat surfaces of mounts 63 which are inclined in two planes so as to impart a trailing angle and a rearward angle for each thinning rod. The trailing angle is defined with respect to the radius of the rotor 27 passing through the bottom end of the rod on the one hand and may be about 30°. The rearward angle is defined as the angle between the rod and the diametral plane of the rotor passing through the same bottom end and may be 32°. The overall orientation of the rods forces the crop material outwardly while their tips smoothen the layer along the inner surface of the chamber 26.

Near their rear ends the rotors 27 are provided with a pair of longitudinally arranged paddles 74. These paddles extend perpendicularly from the rotor tube 50 and assist in discharging the straw from the threshing and separating assembly 16.

The chamber 26 of the threshing and separating assembly 16 has a rear portion including a separating concave assembly 101 disposed adjacent the separating section 58 of the rotor 27. This concave assembly comprises a plurality of interchangeable separating concaves or grates 102. According to one embodiment, as shown in FIGS. 4 and 5, the concave assembly 101 comprises two separating grates 102, each having three transverse curved members 106, one at the front, one in the middle and one at the rear of the grate 102. The curved members are interconnected by a set of spaced, longitudinally arranged slats 107, through which extend a plurality of curved wires 108. The slats 107 are rectangular in cross-section, having their longest side oriented to the axis of the rotor 27. The inward edges are engaged by the crop material for continued threshing action while separating the grain and chaff from the straw.

The inner ends of the curved members 106 have hooks which fit over appropriate mounting means at the centre of the threshing and separating assembly 16. In one embodiment these mounting means may be longitudinal rods 112 mounted through transverse plates 113 of the central framework 111 of the separating assembly. At their outer ends the curved members 106 are welded to a longitudinal flat iron 114 which has apertures for appropriate means such as bolts 116 (FIG. 4) for attaching the outer section of the grate 102 to a profile 115 of the separating assembly. The separating grate 102 can be removed from the harvester 10 after removal of a side panel adjacent the separating concave assembly 101. The bolts 116 are removed such that the outer side of the grate 102 can be lowered, whereafter the hooks 110 can be lifted off the central rod 112.

At the end of the threshing and separating assembly 16, the straw is propelled rearwardly and outwardly by the paddles 74 on the rotors 27. The paddles do not deposit the straw directly onto the ground, but eject it onto a slanting guide plate 125, which is attached to the rear of the separating concave assembly 101, as shown in FIG. 5. The guide plate ends adjacent a transverse beater concave 126 of a beater assembly 128 which is positioned above the chaffer sieve 33. The beater assembly further comprises a transverse beater rotor 127 which is mounted above the concave 126 for engaging the straw which is delivered thereto by the guide plate 125 and for propelling the same through the outlet 37 at the rear of the combine harvester 10.

It is observed that the two counter-rotating rotors 27 tend to deposit most of the straw near the centre of the guide plate 125. For machines operating at high capacities this straw may build up and cause blockages in this portion of the combine harvester 10. Such blockages evolve quickly to the front of the threshing and separating assembly and may cause a complete blockage of the rotors 27. Therefore it is required to make use of the full capacity of the beater assembly 128 and hence to spread out the straw over the full width of the guide plate 125. To this end the rear portion of each rotor chamber 26 is provided with a curved guide plate 130, which generally has the shape of right-angled triangle, with one side which is positioned next to the rear end of the inner chamber walls 122. The outlet edge 131 defining the slanting side of the triangle extends rearwardly and upwardly to the centre line of the rotor 27. As such this outlet edge 131 is generally transverse to the direction of the flow of straw leaving the confines of the chamber 26. The curvature of the guide plate 130 is somewhat larger than the radius of the chamber walls 122. The bases of the triangular plates are welded onto a front support plate 133 which is bolted onto a rear plate 135 of the central framework 111 of the separating assembly. At their rear tips the curved guide plates 130 are joined together at a rear support plate 134, which is bolted onto the rear plate of the threshing and separating assembly 16. The upper edges of the triangular plates 131 extend generally at the level of the rotor axes, to which they are parallel.

The front section of the guide plate 131 deviates the straw that exits the separating assembly near the end of the grates 102 by a larger angle than its rear section, which hardly has any effect on the exit direction of the straw. Consequently the front portion of the straw flow is directed to the sides of the slanted guide plate 125 while its rear portion is propelled downwardly onto the centre of the guide plate. Accordingly the material is spread evenly before it is engaged by the beater rotor 127. As accumulation in one or other section of the beater assembly 128 is prevented, the chances for blockage of the threshing and separating assembly 16 are reduced.

What is claimed is:
1. A combine harvester comprising:
 a main frame;
 a threshing and separating arrangement mounted to said main frame and including:
  a generally cylindrical chamber having a generally longitudinal axis and comprising a separating concave assembly; and a rotor assembly mounted for rotation in said chamber and comprising a generally cylindrical rotor body with a separating section associated with said separating concave assembly; and a beater assembly arranged behind said concave assembly for receiving threshed and separated crop material therefrom and projecting it rearwardly, said beater assembly comprising a transverse guide means mounted behind said separating concave assembly and below said rotor body, and a transverse beater rotor; wherein said chamber further comprises a curved guide plate arranged behind said separating concave assembly and above said guide means for distributing the separated crop material over the full width of said guide means wherein said curved guide plate has an outlet edge which is oriented in a direction which is generally transverse to the direction of the crop flow inside said chamber and wherein said curved guide plate has a generally triangular shape with its base adjacent said separating concave assembly and its tip adjacent the rear end of said chamber.

2. The combine harvester described in claim 1, wherein said curved guide plate has an upper edge extending at the level of the axis of said cylindrical chamber.

3. The combine harvester described in claim 2, wherein said threshing and separating arrangement further comprises:

a pair of adjacent generally cylindrical chambers each having a rotor assembly mounted therein; and a pair of guide plates linked together at their upper edges to form one guide element.

4. The combine harvester described in claim 3, wherein said separating section of said rotor assembly further comprises adjacent its rear end a plurality of generally longitudinally arranged paddles for assisting in discharging the crop from the threshing and separating arrangement.

5. The combine harvester described in claim 4, wherein said separating section of said rotor assembly further comprises:

a plurality of longitudinal elements having a leading, generally longitudinally arranged crop engaging face; and a plurality of transverse elements having a generally transversely arranged crop engaging edge.

* * * * *